United States Patent [19]
Clayton

[11] 3,882,162
[45] May 6, 1975

[54] PROCESS FOR MAKING A C1–C7 ALIPHATIC HYDROCARBYL ESTER OF AN N-[2,6-DI(C1–C7 ALKYL)PHENYL] ALPHA-AMINOCARBOXYLIC ACID

[75] Inventor: Anthony B. Clayton, Wilmington, Del.

[73] Assignee: Hercules Incorporated, Wilmington, Del.

[22] Filed: Oct. 11, 1973

[21] Appl. No.: 405,610

[52] U.S. Cl. .......................... 260/471 A; 260/471 A
[51] Int. Cl. .......................................... C07c 101/44
[58] Field of Search ................................ 260/471 A

[56] References Cited
UNITED STATES PATENTS
3,402,198  9/1968  Bolhofer..................... 260/471 A

*Primary Examiner*—Lorraine A. Weinberger
*Assistant Examiner*—L. A. Thaxton
*Attorney, Agent, or Firm*—George H. Hopkins

[57] ABSTRACT

Disclosed is a process for making a $C_1$–$C_7$ aliphatic hydrocarbyl ester of an N-[2,6-($C_1$–$C_7$ alkyl)phenyl] α-amino-carboxylic acid from the corresponding 2,6-di($C_1$–$C_7$ alkyl)aniline and the corresponding chlorocarboxylic acid ester, which comprises effecting with a catalytic quantity of di($C_1$–$C_7$ alkyl)aniline hydrochloride the reaction of said aniline and said ester.

7 Claims, No Drawings

PROCESS FOR MAKING A C1–C7 ALIPHATIC HYDROCARBYL ESTER OF AN N-[2,6-DI(C1–C7 ALKYL)PHENYL] ALPHA-AMINOCARBOXYLIC ACID

This invention is in the chemical arts. In particular it resides in that part of organic chemistry having to do with aromatic aminocarboxylic acid esters.

$C_1$–$C_7$ Aliphatic hydrocarbyl esters of N-[2,6-di($C_1$–$C_7$ alkyl)phenyl] α-aminocarboxylic acids have utility as intermediate compounds in the preparation of certain herbicidal esters such as those disclosed in The Netherlands published pat. application No. 73.03363, open to public inspection on Sept. 12, 1973.

These intermediate compounds are represented by the structural formula I:

(I) 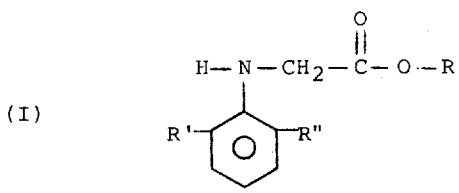

in which R is $C_1$–$C_7$ aliphatic hydrocarbyl, and R' and R'' are $C_1$–$C_7$ alkyl.

The term "hydrocarbyl" as used in this specification means a hydrocarbon radical. Accordingly, $C_1$–$C_7$ aliphatic hydrocarbyl encompasses $C_1$–$C_7$ alkyl, $C_2$–$C_7$ alkenyl and $C_2$–$C_7$ alkynyl. These radicals can be straight or branched. R' and R'' can be the same or different. Examples of $C_1$–$C_7$ alkyl include methyl, ethyl, propyl, isopropyl, butyl, isobutyl, t-butyl, and the like. Examples of $C_2$–$C_7$ alkenyl include vinyl (ethenyl), allyl, propenyl, isopropenyl, 1-butenyl, 2-butenyl, 3-butenyl, 2-methylpropenyl, and the like. Examples of $C_2$–$C_7$ alkynyl include acetenyl (ethynyl), 1-propynyl, 2-propynyl and the like.

These intermediate compounds in general can be made by a process in which the phenylamines and haloalkanoic acid esters corresponding to them are reacted in an inert liquid medium containing a base such as potassium hydroxide or the like. The desired reaction is depicted by the equation:

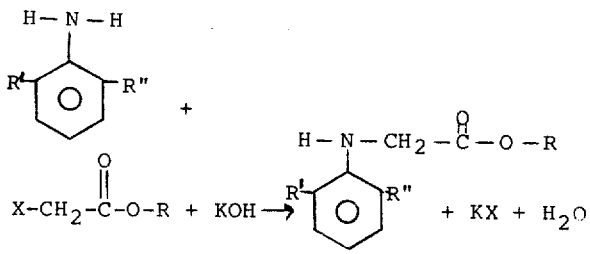

X in the above formulas is halo. However, the resulting reaction mixture has a number of impurities such as, for example, the dicarboxylic acid ester of the formula II:

(II) 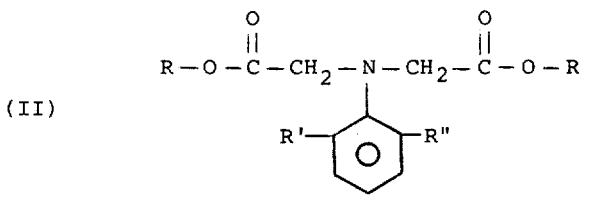

and products resulting from saponification of the ester moiety. Consequently, isolation of the desired compound in the desired degree of purity if difficult to obtain, and the yield of the desired compound is lower than desired.

This invention minimizes these disadvantages of the foregoing process.

In brief, the process of this invention comprises effecting reaction of the corresponding phenylamine and the haloalkanoic acid ester with a catalytic quantity of 2,6-di-($C_1$–$C_7$ alkyl) aniline hydrochloride. In the preferred embodiment of this invention the 2,6-di($C_1$–$C_7$ alkyl)aniline hydrochloride is the hydrochloride of the phenylamine reactant.

In the preferred practice of the process of this invention the phenylamine reactant and the aniline hydrochloride are admixed and the haloalkanoic acid ester is slowly admixed with the resulting mixture.

As above stated, the quantity of 2,6-di($C_1$–$C_7$ alkyl)-aniline hydrochloride employed as catalyst is a catalytic quantity. In general satisfactory results are obtained when the concentration of the hydrochloride is about 0.5–5% by weight of the phenylamine reactant.

In the preferred practise of the process the catalyst can be added as such to the phenylamine reactant or, particularly in the embodiment in which the 2,6-di($C_1$–$C_7$ alkyl)aniline hydrochloride is the hydrochloride of the phenylamine reactant, it can be formed in situ in the phenylamine reactant by admixing with the reactant a quantity of hydrochloric acid equivalent to the desired catalyst concentration.

The reaction can be carried out neat or in the presence of an inert liquid reaction medium for better control of the reaction temperature. Examples of such a liquid reaction medium include benzene, toluene, xylene, and the like.

The preferred reaction temperature range is 100°–250°C. However, higher and lower temperatures are within the broader concepts of this invention. On the other hand, the higher the reaction temperature, the higher is the concentration of impurities such as the dicarboxylic acid ester.

Although in the usual practise of the process of this invention the reaction is carried out at atmospheric pressure, under the broader concepts of this invention higher and lower pressures can be employed.

The reaction time is generally in the range from about 15 minutes to about 10 hours. Lesser and greater reaction times, however, are within the broader concepts of this invention. On the other hand, in general a reaction time of less than about 15 minutes can result in less than a practical conversion of the phenylamine and the haloalkanoic acid ester to the desired product, while in general a reaction time greater than about 7 hours can result in substantial concentrations of impurities.

After completion of the reaction the reaction mixture can be used as is in the reaction of the intermediate compound to form the desired end use compound such as one of those disclosed in the cited published patent application, or the reaction mixture can be treated to isolate the intermediate compound with the desired degree of purity. Such a treatment in one embodiment of the invention comprises admixing the reaction mixture with an inert nonpolar solvent (for example, benzene, toluene, xylene, and the like) for the intermediate compound in quantity preferably sufficient to dissolve substantially all the intermediate compound, if such is not already present, separating solid aniline hydrochloride, if any, from the resulting solution, washing the solution with a weak aqueous solution of an inorganic acid to remove unreacted amine, and removing the solvent by distillation or evaporation.

The best mode now contemplated for carrying out the process of this invention is illustrated by the following examples of specific embodiments thereof. This invention is not limited to these embodiments. In these examples all percentages are by weight unless otherwise indicated, all parts by wieght are indicated by $w$, all parts by volume are indicated by $v$, and each part by weight $w$ bears the same relationship to each part by volume $v$ as the kilogram does to the liter.

EXAMPLE 1

This example illustrates the synthesis of N-(2,6-diethylphenyl)glycine ethyl ester by a specific embodiment of the inventive process in which the reaction is carried out neat or without an inert liquid reaction medium.

A mixture of 2,6-diethylaniline (30 $w$) and 2,6-diethylaniline hydrochloride (1 $w$) is stirred and heated to 180°C. Ethyl chloroacetate (12.2 $w$) is added dropwise over 15 minutes to the mixture and the temperature of the reaction mixture is maintained at 180°C. for 15 minutes after completion of the addition of the ethyl chloroacetate.

After cooling the reaction mixture to room temperature (20°–25°C.), benzene (100 $v$) is admixed with the reaction mixture, and the resulting mixture is filtered. The filtrate is washed twice with water (35 $v$ each time), 4 times with a 10% aqueous solution (35 $v$ each time) of $H_2SO_4$, and once with water (35 $v$). The washed solution is dried over sodium sulfate and the solvent removed therefrom by evaporating to dryness under reduced pressure. The residue (18.9 $w$) consists essentially of N-(2,6-diethylphenyl)glycine ethyl ester. A typical concentration of the ester in the residue as determined by liquid chromotography is 80%.

EXAMPLE 2

This example illustrates the preparation of N-(2,6-diethylphenyl)glycine ethyl ester by another specific embodiment of the inventive process in which the reaction is carried out in an inert liquid reaction medium.

A mixture of 2,6-diethylaniline (268 $w$), 2,6-diethylaniline hydrochloride (5 $w$) and toluene (72 $w$) is heated to 158°C. Ethyl chloroacetate (98 $w$) is added all at once and the resulting reaction mixture established and maintained with stirring at 148°–150°C. for 6.5 hours.

The reaction mixture is then cooled to room temperature (20°–25°C.), toluene (165 $w$) is added, and the resulting diluted mixture filtered to remove solid 2,6-diethylaniline hydrochloride. The resulting filtrate is washed at 80°C. twice with water (400 $v$ each time) and at room temperature (20°–25°C.) 7 times with a 10% aqueous solution (120 $v$ each time) of $H_2SO_4$, and once with water (200 $v$). The washed solution is dried over magnesium sulfate, and the toluene removed by evaporation to dryness under reduced pressure. The residue (135.8 $w$) consists essentially of N-(2,6-diethylphenyl)glycine ethyl ester.

A typical analysis of the residue by liquid chromotography is 92% N-(2,6-diethylphenyl)glycine ethyl ester and 2.9% N-bis(carbethoxymethyl)-2,6-diethylaniline with impurities at a minimum.

EXAMPLE 3

This example illustrates the preparation of N-(2,6-diethylphenyl)glycine allyl ester by a specific embodiment of the process of this invention.

2,6-Diethylaniline (11.6 $w$), 2,6-diethylaniline hydrochloride (0.4 $w$) and dry toluene (3.1 $w$) are stirred together. While the resulting mixture is refluxed at 160°C., allyl chloroacetate (10.5 $w$) is added slowly thereto. The resulting reaction mixture is refluxed at 145°C. for 2 hours and then cooled to 20°–25°C. Toluene (75 $v$) is admixed with it. Solids in the diluted reaction mixture are separated by filtration and washed with toluene. The wash liquid is mixed with the filtrate and the solution is washed once with water (40 $v$), once with a 10% aqueous solution (40 $v$) of $H_2SO_4$, and 3 times with water (40 $v$ each time). The washed solution is dried over $MgSO_4$ overnight, the $MgSO_4$ is removed by filtration, and the solvent is removed from the filtrate by distillation. The residue (7.0 $w$) is typically a dark brown resin which consists essentially of N-(2,6-diethylphenyl)glycine allyl ester with impurities at a minimum.

EXAMPLE 4

This example illustrates the preparation of N-(2-ethyl-6-methylphenyl)glycine allyl ester by a specific embodiment of the process of this invention. 2-Methyl-6-ethylaniline (10.5 $w$), 2,6-diethylaniline hydrochloride (0.4 $w$) and dry toluene (3.1 $w$) are stirred together. While the resulting mixture is refluxed at 160°C., allyl chloroacetate (10.5 $w$) is added slowly. After addition of the allyl chloroacetate has been completed, the resulting reaction mixture is refluxed at 155°–162°C. for 5 hours. Typically a few solids may appear about 1 hour after completion of the addition of the chloroacetate, but they tend to disappear by the end of the 5 hour reflux period. The reaction mixture is cooled to 20°–25°C. and allowed to sit overnight. Toluene (75 $v$) is added to the reaction mixture. The resulting solution is washed once with water (50 $v$), twice with a 10% aqueous solution (50 $v$ each time) of $H_2SO_4$, and three times with water (50 $v$ each time). The washed solution is dried over $MgSO_4$, the $MgSO_4$ is removed by filtration, and the solvent is removed by distillation. The residue (4.7 $w$) is typically a dark brown liquid. It consists essentially of N-(2-ethyl-6-methylphenyl)glycine allyl ester with a minimum of impurities.

EXAMPLE 5

This example illustrates the preparation of N-(2,6-diethylphenyl)glycine 1-butyn-3-yl ester by a specific embodiment of the process of this invention.

Stirred together at reflux (140°C.) are 2,6-diethylaniline (25.3 $w$), 2,6-diethylaniline hydrochloride (1.0 $w$), and dry toluene (8 $w$) to form a mixture. 1-Butyn-3-yl chloroacetate (25.0 $w$) is admixed slowly with the mixture, and the resulting reaction mixture is refluxed 2 hours at 155°C. The reaction mixture is cooled to 20°–25°C. and toluene (150 $v$) is added. The diluted mixture is filtered to remove solids and the filtrate is washed once with water (100$v$), once with a 10% aqueous solution (100 v) of $H_2SO_4$, and three times with water (100 v each time). The washed solution is dried over $MgSO_4$ and, after removal of the $MgSO_4$ by filtration, the toluene is removed by distillation. The residue (22.3 w) is typically an amber liquid. It consists essentially of N-(2,6-diethylphenyl)glycine 1-butyn-3-yl ester with a minimum of impurities.

EXAMPLE 6

This example illustrates the synthesis of N-(2-ethyl-6-methylphenyl)glycine 1-butyn-3-yl ester by a specific embodiment of the invention process.

Stirred together at reflux (140°C.) are 2-ethyl-6-methylaniline (22.95 w), 2,6-diethylaniline hydrochloride (1.0 w), and dry toluene (8 w). To this mixture is slowly added 1-butyn-3yl chloroacetate (25.0 w). The resulting reaction mixture is refluxed 2 hours, and then cooled to 20°-25°C. After addition of toluene (150 v) to the reaction mixture, the diluted reaction mixture is filtered to remove solids, and the filtrate is washed with water (100 v), a 10% aqueous solution (100 v) of $H_2SO_4$, and 3 times with water (100 v). After drying the washed solution over $MgSO_4$, and filtering to remove the $MgSO_4$, the toluene is removed by distillation. The residue (10.0 w) is typically an amber liquid. It consists essentially of N-(2-ethyl-6-methylphenyl)glycine 1-butyn-3-yl ester with a minimum of impurities.

Thus, this invention provides a process for reacting the phenylamine and haloalkanoic acid ester corresponding to an intermediate compound of the above formula I to obtain said intermediate compound with a minimum of impurities.

Other features, advantages and specific embodiments of this invention will become readily apparent to those exercising ordinary skill in the art after reading the foregoing disclosures. In this connection, while specific embodiments of this invention have been described in considerable detail, variations and modifications of these embodiments can be effected without departing from the spirit and scope of the invention as disclosed and claimed.

The expression "consisting essentially of" as used in this specification excludes any unrecited substance at a concentration sufficient to substantially adversely affect the essential properties and characteristics of the composition being defined, while permitting the presence of one or more unrecited substances at concentrations insufficient to substantially adversely affect said essential properties and characteristics.

I claim:

1. A process for synthesizing a $C_1$-$C_7$ aliphatic hydrocarbyl ester of an N-[2,6-di($C_1$-$C_7$ alkyl)phenyl] α-aminocarboxylic acid from the corresponding 2,6-di($C_1$-$C_7$alkyl)aniline and the corresponding chlorocarboxylic acid ester, which comprises effecting with a catalytic quantity of 2,6-($C_1$-$C_7$ alkyl)aniline hydrochloride reaction of said aniline and said ester.

2. A process according to claim 1 in which said reaction is carried out at 100°-250°C. for a period of time from about 15 minutes to about 5 hours, and said catalytic quantity is about 0.5-5% by weight of said aniline.

3. A process according to claim 2 in which the reaction is carried out neat.

4. A process according to claim 2 in which the reaction is carried out in an inert liquid reaction medium.

5. A process according to claim 4 in which said hydrochloride is the hydrochloride salt of said aniline reactant.

6. A process according to claim 5 in which said aniline is 2,6-diethylaniline.

7. A process according to claim 6 in which said chlorocarboxylic acid ester is ethyl chloroacetate.

* * * * *